US012551049B2

United States Patent
Patil et al.

(10) Patent No.: US 12,551,049 B2
(45) Date of Patent: Feb. 17, 2026

(54) SYSTEM AND A METHOD OF PROCESSING A FOOD PRODUCT

(71) Applicant: HCL Technologies Limited, New Delhi (IN)

(72) Inventors: Yuvaraj D Patil, Bengaluru (IN); Mohan Sriram, Bengaluru (IN); Vishwanath Vazar, Bengaluru (IN)

(73) Assignee: HCL Technologies Limited, New Delhi (IN)

( * ) Notice: Subject to any disclaimer, the term of this patent is extended or adjusted under 35 U.S.C. 154(b) by 198 days.

(21) Appl. No.: 17/151,700

(22) Filed: Jan. 19, 2021

(65) Prior Publication Data

US 2022/0071441 A1   Mar. 10, 2022

(51) Int. Cl.
| | |
|---|---|
| A47J 31/44 | (2006.01) |
| A47J 31/40 | (2006.01) |
| A47J 31/46 | (2006.01) |
| A47J 43/044 | (2006.01) |
| B65D 85/804 | (2006.01) |

(52) U.S. Cl.
CPC ......... *A47J 31/4492* (2013.01); *A47J 31/407* (2013.01); *A47J 31/4407* (2013.01); *A47J 31/461* (2018.08); *A47J 31/462* (2013.01); *A47J 43/044* (2013.01); *B65D 85/8049* (2020.05); *B65D 85/8058* (2020.05); *A47J 2043/04472* (2013.01); *A47J 2202/00* (2013.01); *A47J 2203/00* (2013.01)

(58) Field of Classification Search
CPC .. A47J 31/4492; A47J 31/407; A47J 31/4407; A47J 31/461; A47J 31/462; A47J 43/044; A47J 2043/04472; A47J 2202/00; A47J 2203/00; B65D 85/8049; B65D 85/8058
See application file for complete search history.

(56) References Cited

U.S. PATENT DOCUMENTS

| | | | |
|---|---|---|---|
| 6,402,365 B1 * | 6/2002 | Wong | A47J 43/046 366/601 |
| 7,039,602 B1 | 5/2006 | Kapadia et al. | |
| 9,272,250 B2 * | 3/2016 | Pryor, Jr. | B01F 35/1453 |

(Continued)

FOREIGN PATENT DOCUMENTS

| | | |
|---|---|---|
| CN | 201353099 Y | 12/2009 |
| CN | 108244976 A | 7/2018 |

(Continued)

*Primary Examiner* — Jimmy Chou
*Assistant Examiner* — Thao Uyen Tran-Le
(74) *Attorney, Agent, or Firm* — Kendal M. Sheets

(57) ABSTRACT

A food processing device configured to process a food product stored in a pod is disclosed. The food processing device may further include a drive assembly. The drive assembly may include a drive motor configured to move linearly in the vertical direction, and a linear actuator coupled to the drive motor. The linear actuator may cause the drive motor to move linearly in the vertical direction. The drive assembly may further include a drive shaft coupled to the drive motor. The drive shaft may be configured to engage or disengage with the top shaft of the pod owing to the linear movement of the drive motor in vertical direction. Upon engaging with the tops shaft of the pod, the drive shaft may be further configured to impart rotary motion to the top shaft.

5 Claims, 8 Drawing Sheets

(56) References Cited

U.S. PATENT DOCUMENTS

| | | | |
|---|---|---|---|
| 9,314,755 B2* | 4/2016 | Kozlowski | A23G 9/12 |
| 9,415,358 B2* | 8/2016 | Pryor, Jr. | A47J 43/044 |
| 9,468,331 B2* | 10/2016 | De'Longhi | A47J 31/4489 |
| 9,493,298 B2 | 11/2016 | Evans et al. | |
| 9,579,615 B2* | 2/2017 | Farrell | B01F 27/00 |
| 10,099,443 B1 | 10/2018 | Evans et al. | |
| 10,898,031 B2* | 1/2021 | Connell | B01F 27/806 |
| 11,076,720 B2* | 8/2021 | Ochoa | B01F 35/7139 |
| 11,419,458 B2* | 8/2022 | Gardner | A47J 43/044 |
| 2006/0115042 A1 | 6/2006 | Riess et al. | |
| 2012/0082776 A1 | 4/2012 | Le Roux et al. | |
| 2013/0264404 A1* | 10/2013 | Rosenzweig | B01F 35/32 366/293 |
| 2014/0314918 A1 | 10/2014 | Wettlaufer et al. | |
| 2015/0013279 A1* | 1/2015 | Swerchesky | A47J 31/407 53/381.2 |
| 2015/0201789 A1 | 7/2015 | Smith et al. | |
| 2015/0313413 A1* | 11/2015 | Ochoa | B01F 27/806 366/244 |
| 2016/0016133 A1* | 1/2016 | Merritt | B01F 27/806 366/242 |
| 2016/0106255 A1 | 4/2016 | Gordon et al. | |
| 2016/0220069 A1* | 8/2016 | Gardner | A47J 43/044 |
| 2016/0278570 A1* | 9/2016 | Shi | A47J 31/58 |
| 2017/0119199 A1* | 5/2017 | Williston | F16K 7/06 |
| 2017/0215632 A1* | 8/2017 | Tinkler | A47J 31/407 |
| 2019/0008325 A1* | 1/2019 | Huerta-Ochoa | A47J 43/082 |
| 2019/0069724 A1* | 3/2019 | Ochoa | B01F 27/806 |
| 2019/0246842 A1* | 8/2019 | Gardner | A47J 43/044 |
| 2019/0374067 A1* | 12/2019 | Duffy | B01F 27/1152 |
| 2020/0356741 A1 | 11/2020 | Principato | |
| 2021/0045572 A1* | 2/2021 | Ninomiya | A47J 31/4492 |

FOREIGN PATENT DOCUMENTS

| | | |
|---|---|---|
| CN | 109588989 A * | 4/2019 |
| CN | 209202048 U | 8/2019 |
| EP | 2369961 A | 10/2011 |
| EP | 3533726 A1 | 9/2019 |
| WO | 1996006541 A1 | 3/1996 |
| WO | 2010098855 A2 | 9/2010 |
| WO | 2019096830 A1 | 5/2019 |

* cited by examiner

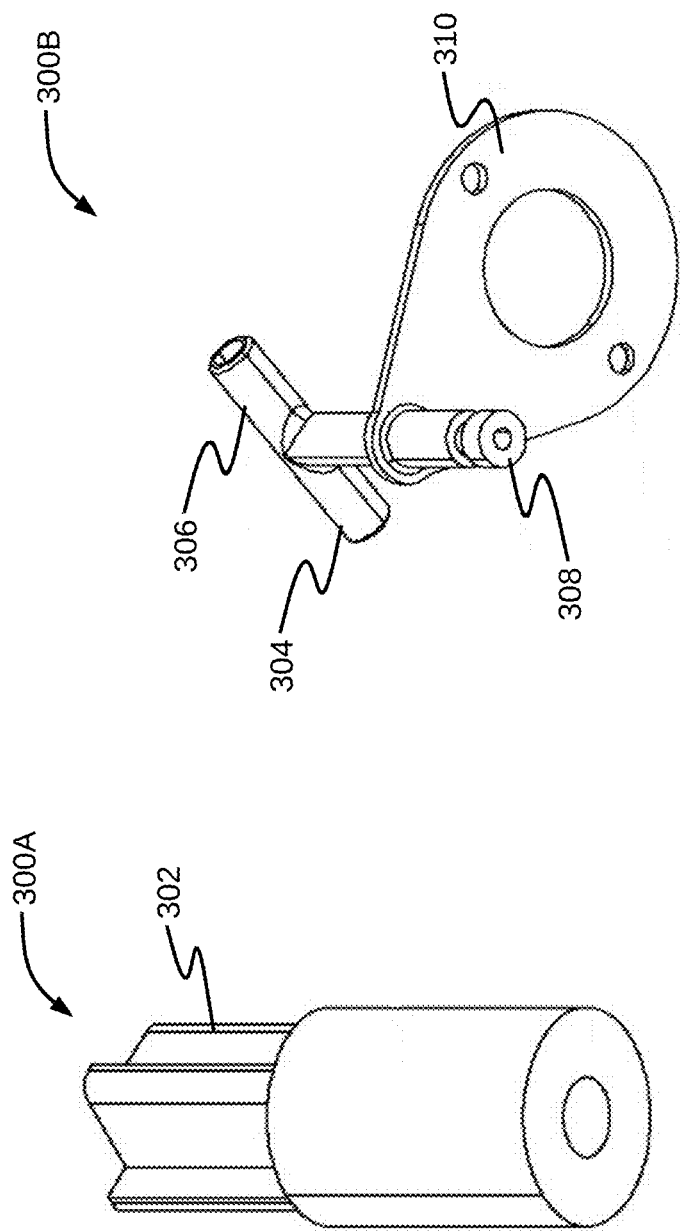

SYSTEM AND A METHOD OF PROCESSING A FOOD PRODUCT

TECHNICAL FIELD

This disclosure relates generally to food processing, and more particularly to a food processing device, a pod, and a method of processing food using the food processing device and the pod.

BACKGROUND

Packaged fruit juice and vegetable juice has been lately gaining popularity among consumers, especially, with those who are health and fitness conscious. As conventional soft drinks and other processed beverages are low on nutritional value as compared to the fruit and vegetable juices, demand for packaged fruit juice and vegetable juice has been on the rise. For example, fresh juices or cold pressed juices may include natural extracts from fruits and vegetables.

However, preparation of natural fruit or vegetable juice involves a long distribution network including steps of procuring, cold-storing, washing and cutting, and finally blending the fruits and vegetables in a blender. Further, upon blending, the blender needs to be washed which is time consuming. Moreover, washing consumes large quality of water.

Therefore, an effective and efficient solution for preparing juice from fruits and vegetables in a quick and hassle-free manner is desired.

SUMMARY

In one embodiment, a food processing device is disclosed. The food processing device may include a housing including a pod receiving region configured to receive a pod. The food processing device may be configured to process a food product stored in the pod. The food processing device may further include a drive assembly. The drive assembly may include a drive motor configured to move linearly in the vertical direction and a linear actuator coupled to the drive motor. The linear actuator is to cause the drive motor to move linearly in the vertical direction. The drive assembly may further include a drive shaft coupled to the drive motor. The drive shaft may be configured to engage or disengage with the top shaft of the pod owing to the linear movement of the drive motor in vertical direction, and wherein upon engaging with the tops shaft of the pod, the drive shaft is further configured to impart rotary motion to the top shaft.

In another embodiment, a pod for processing food using a food processing device is disclosed. The pod may include a container for receiving a food product, the container having a bottom surface. The pod may further include a top shaft having one or more blades. The top shaft may be configured to engage or disengage with a drive shaft of the food processing device. Upon engaging with the top shaft, the drive shaft may be configured to impart rotary motion to the top shaft of the pod to process the food product inside the pod. The pod may further include a bottom shaft coupled to the top shaft, and a breakable seal on the bottom surface of the pod. The breakable seal may be configured to be broken by a downward movement of the bottom shaft to create a bottom opening through the bottom surface to allow the contents of the pod to flow out of the pod via the bottom opening.

In yet another embodiment, a method of processing a food product in a pod using a food processing device is disclosed. The method may include detecting presence of a pod in a pod receiving region of the food processing device, and upon detecting the presence of the pod, scanning an identification feature on the pod to identify one or more properties of the pod and the food product stored inside the pod. The method may further include causing a drive motor to move vertically downwards to engage a drive shaft of the drive motor with a top shaft of the pod, and upon engaging of the drive shaft of the drive motor with the top shaft of the pod, causing the drive shaft to rotate at a predetermined speed for a predetermined time, based on the identified one or more properties of the pod and the food product stored inside the pod.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3A illustrates a front view of a coupler, in accordance with an embodiment.

FIG. 3B illustrates a perspective view of a three-way fitting valve, in accordance with an embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1B:
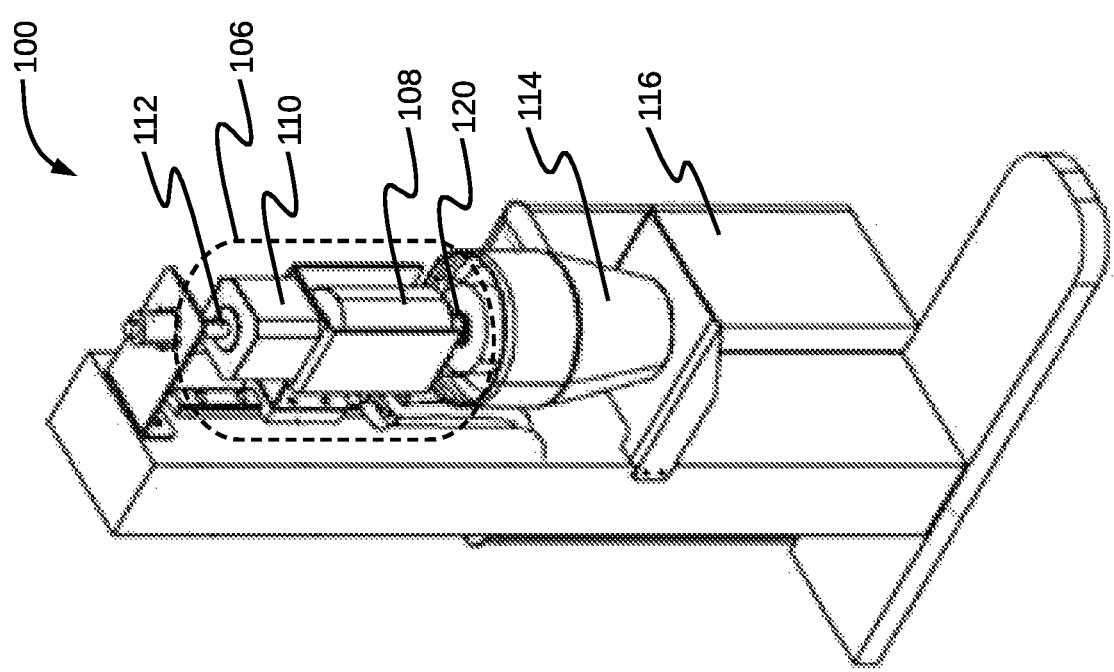
FIG. 1A-1B illustrate perspective views of a food processing device, in accordance with an embodiment.
Figure 1A:
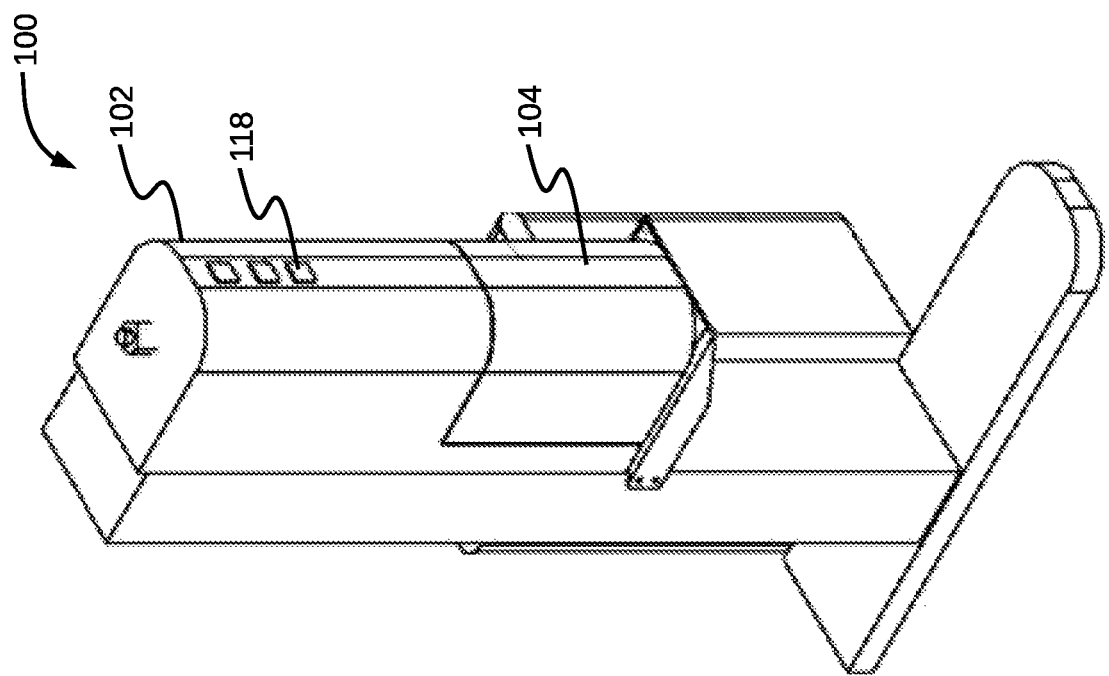

Referring now to FIG. 1A, perspective view of a food processing device 100 is illustrated, in accordance with an embodiment. In some embodiments, the food processing device 100 may include a housing 102. The housing 102 may include a pod receiving region configured to receive a pod (not shown in FIG. 1A). The housing 102 may include a lid 104 movable between a closed an open position. The lid 104 may be configured to allow or shut access to the pod receiving region. For example, in the closed position, the lid 104 may cover the pod receiving region, as shown in the FIG. 1A. It may be noted that the food processing device 100 is configured to process a food product stored in the pod. By way of an example, the food product stored in the pod may be cut and peeled fruits or vegetables. Further, processing the food product may include chopping and blending the fruits or vegetables with a liquid like water to produce vegetable or fruit juice.

Referring to FIG. 1B, a perspective view of the food processing device 100 showing internal components of the food processing device 100 is illustrated, in accordance with an embodiment. The food processing device 100 may include a drive assembly 106. The drive assembly 106 may include a drive motor 108 configured to move linearly in the vertical direction. The drive assembly 106 may further include a linear actuator 110 coupled to the drive motor 108. The linear actuator 110 may cause the drive motor 108 to move linearly in the vertical direction. In some embodiments, the drive assembly 106 may further include a lead screw 112 coupled to the linear actuator 110. The linear actuator 110 may cause the drive motor 108 to move linearly in the vertical direction upon rotation of the lead screw 112. By way of an example, the linear actuator 110 may be an electrical motor. The drive motor 108 may be coupled to the linear actuator which in turn may be coupled to the lead screw via threads of the lead screw, such that a clockwise (CW) and a counter clockwise (CCW) rotation (imparted by the linear actuator 110) may cause the drive motor 108 to travel vertically downwards and upwards, respectively.

The drive assembly 106 may further include a drive shaft 120 coupled to the drive motor 108. It may be noted that the drive shaft 120 may be configured to engage or disengage with a top shaft of a pod 114 owing to the linear movement of the drive motor 108 in the vertical direction. In some embodiments, the drive shaft 120 may engage with the top shaft of the pod via a coupler. Further, upon engaging with the top shaft of the pod, the drive shaft 120 may be configured to impart rotary motion to the top shaft.

In some embodiments, the food processing device 100 may further include a liquid tank 116 to supply a liquid to the pod 114 positioned in the pod receiving region, via a first conduit (not shown in the FIG. 1B) and a liquid pump (not shown in the FIG. 1B). For example, the liquid may be water, that may be added to the pod having cut fruits or vegetables to make juice thereof. It may be noted that the liquid tank may be configured to couple with the pod 114 to supply the liquid via a three-way fitting valve (not shown in the FIG. 1B) fitted to the drive motor 108 which engages with the pod 114.

Alternately or additionally, the food processing device 100 may include an air pump (not shown in the FIG. 1B) to supply air into the pod 114 positioned in the pod receiving region via a second conduit (not shown in the FIG. 1B). Similarly, the air pump may be configured to couple with the pod 114 to supply air via the three-way fitting valve fitted to drive motor 108 which engages with the pod 114. By way of an example, air may be supplied to the pod at high pressure, after processing of the food product inside the pod is completed, so as to completely remove the processed food product from the pod.

In some embodiments, the food processing device 100 may further include a heating and cooling unit (not shown in the FIG. 1B) coupled to the liquid tank 116. The heating and cooling unit may be configured to receive liquid from the liquid tank 116 to increase or decrease the temperature of the liquid flowing from the liquid tank 116. Further, in such embodiments, the food processing device 100 may include a temperature sensor to determine temperature reading of the liquid in the heating and cooling unit. Furthermore, the food processing device 100 may include a liquid level sensor to sense level of the liquid in the liquid tank 116, and a liquid flow sensor to measure output flow of the liquid from the liquid tank 116 to the pod 114 via the first conduit.

The food processing device 100 may further include a pod sensor to detect presence of the pod 114 in the pod receiving region. Further, the food processing device 100 may include a pod identity sensor configured to identify one or more pod properties, by scanning an identification feature on the pod positioned in the pod receiving region. For example, the identification feature may be a barcode. Upon scanning the identification feature, the scanned identification feature may be sent to a control unit of the food processing device 100. The control unit may determine the properties of the pod and the food product inside the pod, by mapping the scanned identification feature with a database. For example, the control unit may determine whether the pod is a "On-The-Go" or an "Instant Juice" type pod. It may be further noted that the "On-The-Go" type pod may include a cutting member (e.g. a blade) inside the pod, that may be used to process the food product inside the pod, and upon processing, the food product may be consumed directly from the pod. The "Instant Juice" type pod may also include a cutting member, but the processed food product may be required to be removed from the pod for consuming. The "Instant Juice" type pod may, therefore, include a spout at the bottom surface of the pod to drain the processed food product (e.g. juice) from the pod.

The food processing device 100 may include a lid sensor to identify an open or close position of the lid 104 of the food processing device 100. As mentioned earlier, the lid 104 may be configured to allow or shut access to the pod receiving region. The food processing device 100 may further include at least one position sensor to sense position of the drive motor, as the motor travels in the vertical direction.

As shown in FIG. 1A, in some embodiments, the housing 102 of the food processing device 100 may include a plurality of user interface buttons 118 to receive inputs from a user. The housing 102 may further include a display screen to display at least one of status of food processing of the food product inside the pod 114, a level of the liquid in the liquid tank, and a temperature reading of the liquid in the heating unit OR cooling unit, and so on.

Figure 2C:
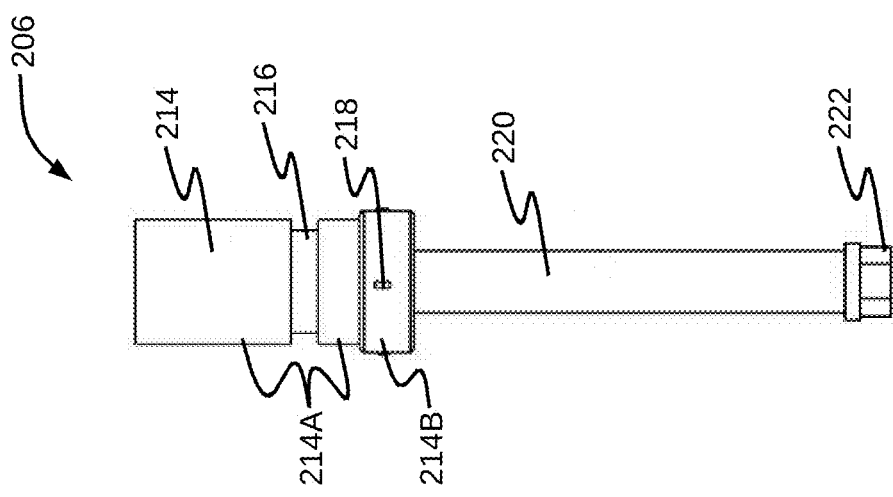
FIG. 2C illustrates a front view of a top shaft, in accordance with an embodiment.
Figure 2B:
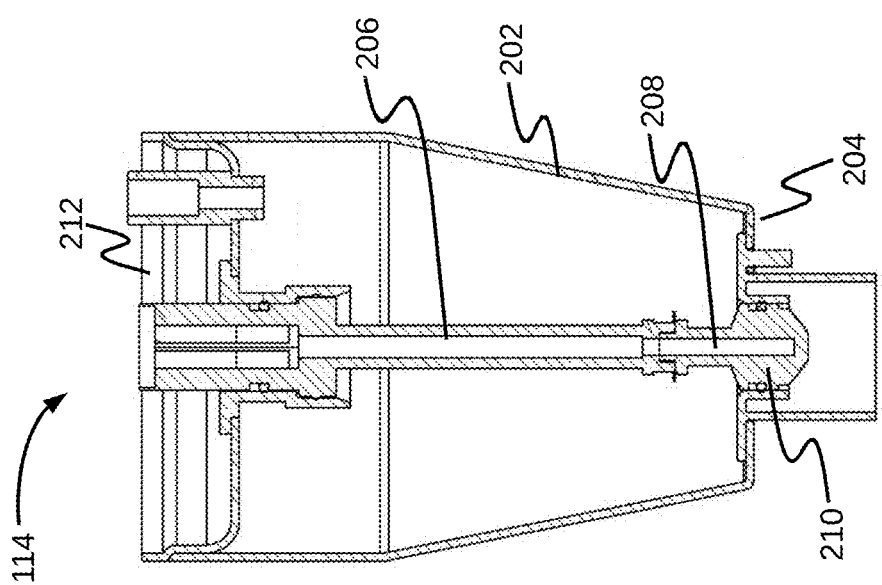
FIG. 2A-2B illustrate a perspective view and a cross-sectional view, respectively, of the pod for processing food using the food processing device, in accordance with an embodiment.
Figure 2A:
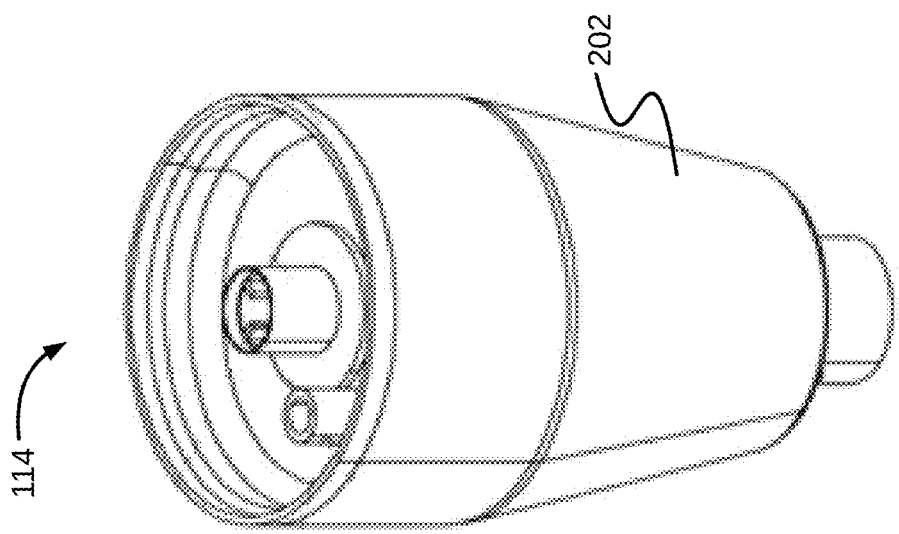
Figure 2H:
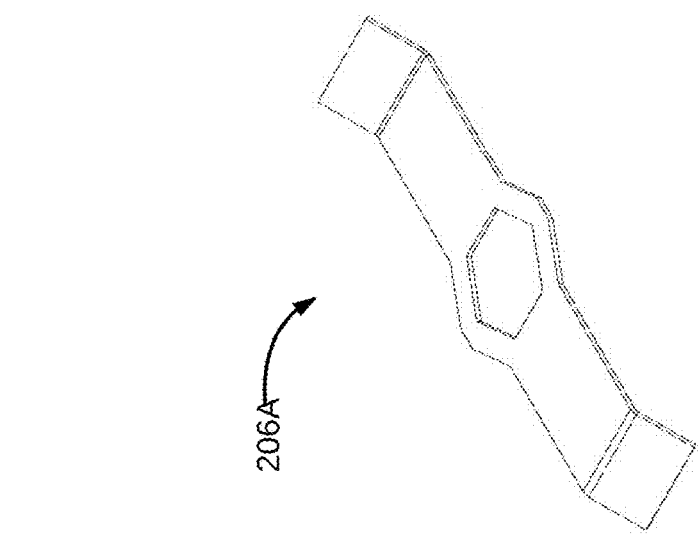
FIG. 2H illustrates a perspective view of a blade assembly, in accordance with an embodiment.

Referring now to FIGS. 2A and 2B, a perspective view and a cross-sectional view, respectively of the pod 114 is illustrated, in accordance with an embodiment. The pod 114 may include a container 202 for receiving a food product. The container 202 may include a bottom surface 204. The pod 114 may further include a top shaft 206. The top shaft 206 may include a blade assembly 206A having one or more blades (as shown in FIG. 2H). Further, the top shaft 206 may be configured to engage or disengage with the drive shaft of the food processing device 100. As mentioned earlier, upon engaging with the top shaft 206, the drive shaft may impart rotary motion to the top shaft 206 of the pod 114 to process the food product inside the container 202 of pod 114.

The pod 114 may further include a bottom shaft 208 coupled to the top shaft 206. For example, the bottom shaft 208 may be mechanically coupled to the top shaft 206. The top shaft 206 and the bottom shaft 208 are further explained in detail, in conjunction with FIG. 2C and FIG. 2D, respectively. The pod 114 may further include a breakable seal 210 on the bottom surface 204 of the pod 114. The breakable seal 210 may be configured to be broken by a downward movement of the bottom shaft 208 to create a bottom opening through the bottom surface 204 to allow the contents of the pod 114 to flow out of the pod 114 via the bottom opening. To this end, the pod 114 may include a spout fitted to the bottom surface 204, so as to allow the contents of the pod 114 to flow out of the pod 114 upon creation of the bottom opening. The spout is further explained in detail in conjunction with FIG. 2E. The container 202 of the pod 114 may include a top opening 212. The top opening 212 may be configured to be closed by fitting a cap on the top opening 212 that may be sealed with the container 202. The top opening 212 is further explained in detail in conjunction with FIG. 2F.

Referring now to FIG. 2C, a front view of a top shaft 206 is illustrated, in accordance with an embodiment. The top shaft 206 may include cylindrical stem 214 at top, and a groove 216 on a first surface 214A of the stem 214 to receive an O-ring (not shown on FIG. 2C). The stem 214 may suddenly widen along a second surface 214B, to accommodate the inner shape of a top bushing (as further explained in detail in conjunction with FIG. 2G). The first surface 214A and the second surface 214B may be in sliding fit with the inner surface of the top bushing, to create an air tight seal at the top. A dimple 218 may be provided on the second surface 214B of the stem 214. The dimple 218 may sit inside a grove of the top bushing. This entire arrangement may allow the top shaft 206 to rotate inside the top bushing, move down with the linear actuator, or manually be pushed down. Further, the grove may hold the shaft in position while rotating. When the drive motor moves down, the grove would slightly deform allowing the shaft to move down with the drive motor. The top shaft 206 may include a shank 220 further down, and a feature 222 at the bottom of the shank 220 to mount a blade or mixer.

Figure 2F:
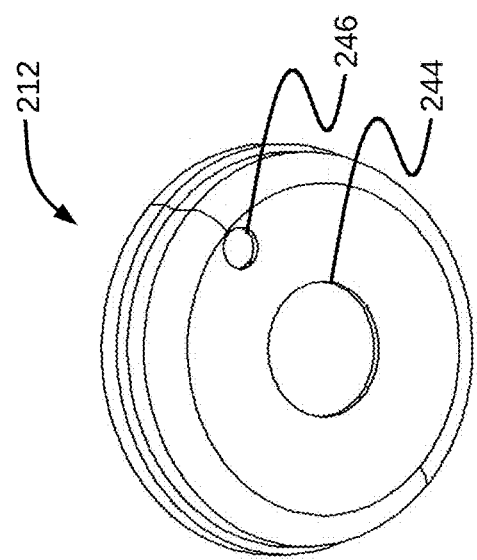
FIG. 2F illustrates a perspective view of a top opening of a pod, in accordance with an embodiment.
Figure 2G:
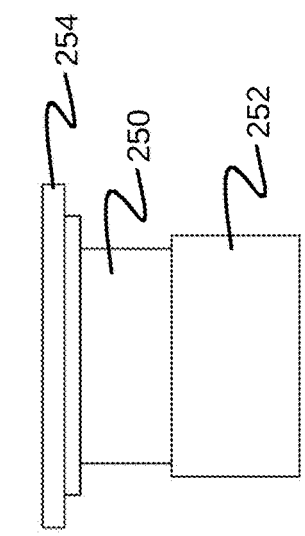
FIG. 2G illustrates a front view of a top bushing, in accordance with an embodiment.
Figure 2D:
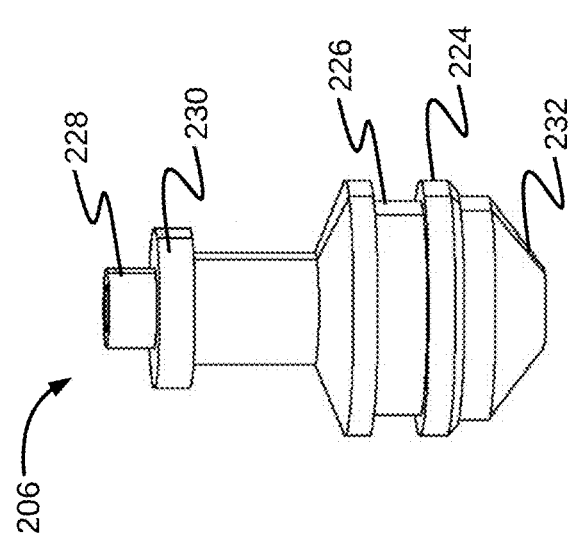
FIG. 2D illustrates a front view of a bottom shaft, in accordance with an embodiment.

Referring now to FIG. 2D, a front view of a bottom shaft 208 is illustrated, in accordance with an embodiment. The bottom shaft 208 may include a cylindrical stem 224 at the bottom having a groove 226 on the surface of the cylindrical stem 224. An O-ring (not shown in FIG. 2D) may sit in this groove. Further, the cylindrical stem 224 may be in a sliding fit with a wall (39) of a spout (a shown in FIG. 3), thus creating an air tight seal at the bottom side of the pod. The cylindrical stem 224 further includes a collar 230 and a lock 228. The lock 228 may allow the bottom shaft 208 to be fixed at the bottom of the top shaft 206. The collar 230 may restrict the movement of blade or mixer downwards. This arrangement would allow the bottom shaft 208 to rotate and move down along with the top shaft 206 and the drive motor. As the drive motor moves down, the bottom shaft 208 would move down, thereby breaking open the seal and allowing the inside blended food product (or a simply a juice) to be pushed out. Further down, the cylindrical stem 224 may have a gradually reducing surface 232 which would allow the blended food product to flow in a stream without any splatter.

Figure 2E:
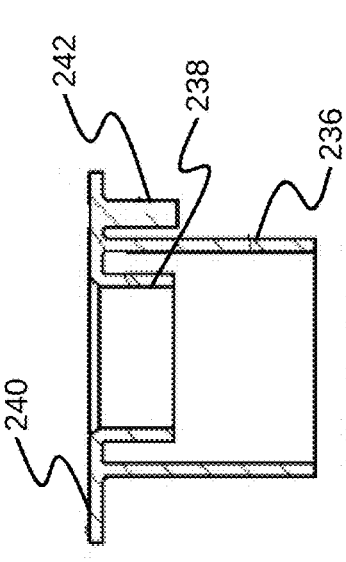
FIG. 2E illustrates a front view of a spout, in accordance with an embodiment.

Referring now to FIG. 2E, a front view of the spout 234 is illustrated, in accordance with an embodiment. The spout 234 may include two concentric cylindrical walls—an outer wall 236 and an inner wall 238, the outer wall 236 being longer than the inner wall 238. The spout 234 may further include a top collar 240 which may enable a top bushing to be fixed at the bottom the container 202. The spout 234 may further include a locating pin 242 integrated to the top collar 240.

Referring now to FIG. 2F, a perspective view of the top opening 212 is illustrated, in accordance with an embodiment. The top opening 212 may include a first hole 244. In some embodiment, a coupler may be inserted in the pod 114 via the first hole 244. It may be noted that the drive shaft (coupled to the drive motor) may couple with the top shaft (of the pod) via the coupler (the coupler is further explained in conjunction with FIG. 3) In alternate embodiments, the first hole 244 may allow the top shaft 206 to pass through out of the pod 114 to thereby allow the top shaft 206 to engage with the drive shaft. Further, in some embodiments, the first hole 244 may receive a top bushing 248. The top opening may further include a second hole 246 acting as a port to receive one end of the 3-way fitting valve through which air and water may be received inside the pod 114. This port may include a one directional valve.

Referring now to FIG. 2G, a front view of the top bushing 248 is illustrated, in accordance with an embodiment. The top bushing 248 may be cylindrical in shape and hollow from inside, such that the inside surface is concentric to outer surface. The inner surface may be narrow at top section 250 and may suddenly widen towards the bottom section 252 to create a step. Further, a grove may be present on the inner surface of the top bushing 248. The top bushing 248 may further include a collar 254 which may enable the top bushing 248 to be fixed on the cap fitted on the pod 114.

Referring now to FIG. 2H, a perspective view of a blade assembly 206A, in accordance with an embodiment. As shown in the FIG. 2H, the blade assembly 206A may include one or more blades. The one or more blades may be made of plastic or any other polymeric or metallic material.

Referring now to FIG. 3A, a coupler 300A is illustrated, in accordance with an embodiment. The coupler 300A may be configured to be coupled to the drive shaft of the drive motor. In some embodiments, the coupler 300A may include one or more flutes 302 which may enable the coupler 300A to engage with a top shaft 206.

In some embodiments, along with the coupler 300A, a three-way fitting valve may be fixed at the bottom of the drive shaft. A three-way fitting valve 300B is illustrated in FIG. 3B, in accordance with an embodiment. The three-way fitting valve 300B may be fixed at the bottom of the drive shaft using a bracket 310. Further, the three-way fitting valve 300B may include a first inlet port 304, a second inlet port 306, and an outlet port 308. For example, the liquid (water) may be supplied to the pod via the first conduit which may be coupled to the first inlet port 304. Similarly, air may be supplied to the pod via the second conduit which may be coupled to the second inlet port 306.

Figure 4:
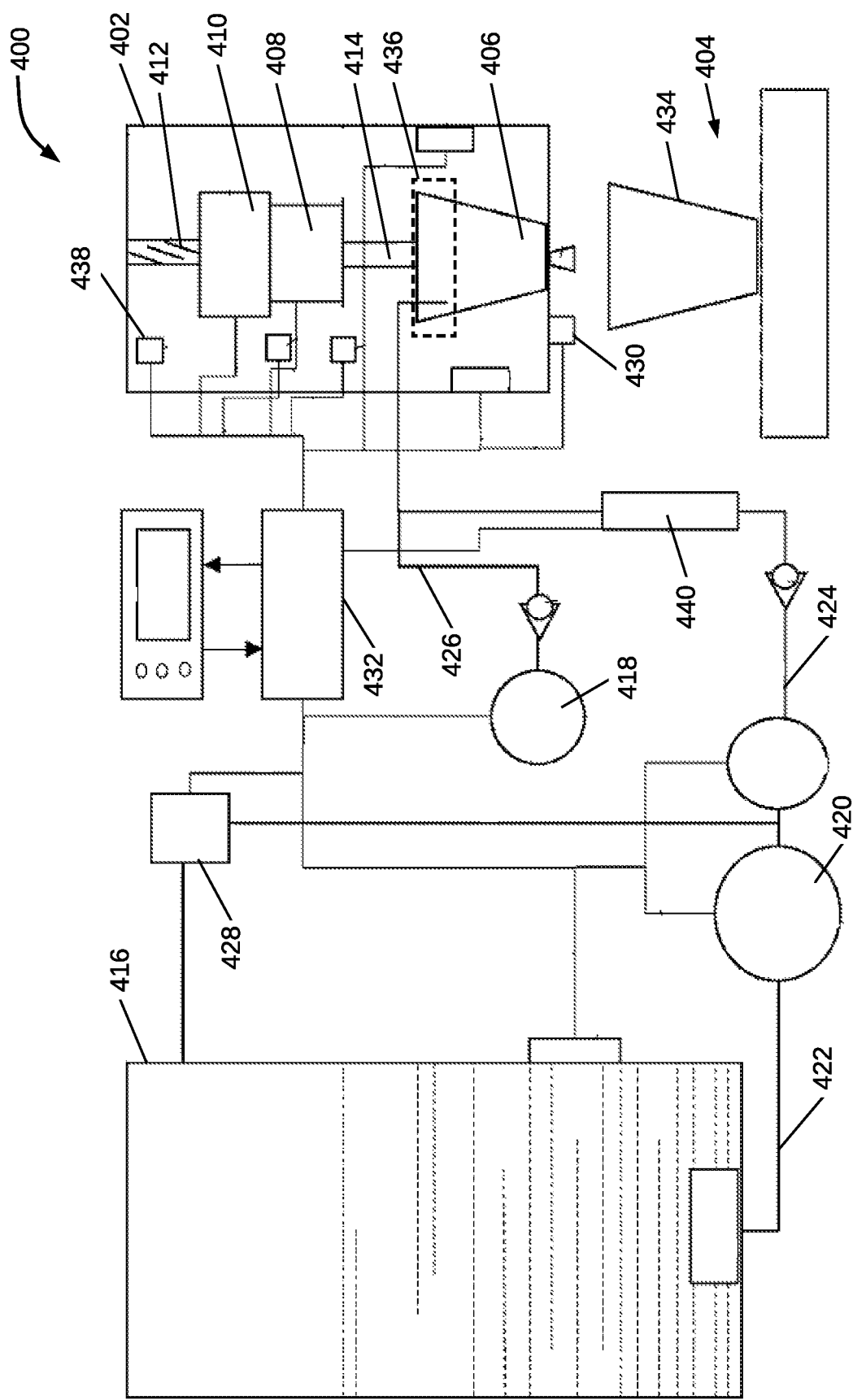
FIG. 4 is schematic diagram of a food processing device, in accordance with an embodiment.

Referring now to FIG. 4, a schematic diagram of a food processing device 400 (corresponding to the food processing device 100) is illustrated, in accordance with an embodiment. The food processing device 400 may include a housing 402 that may further include a pod receiving region 404 configured to receive a pod 406. The food processing device 400 may further include a drive assembly which may include a drive motor 408 configured to move linearly in the vertical direction. The drive assembly may further include a linear actuator 410 coupled to the drive motor 408. The linear actuator 410 may cause the drive motor 408 to move linearly in the vertical direction. The drive assembly may further include a lead screw 412 coupled to the linear actuator 410, such that the linear actuator 410 may cause the drive motor 408 to move linearly in the vertical direction, via the lead screw 412.

The drive assembly may further include a drive shaft (not shown in FIG. 4) coupled to the drive motor 408. The drive shaft may be configured to engage or disengage with a top shaft (not shown in FIG. 4) of the pod 406 owing to the linear movement of the drive motor in the vertical direction, and upon engaging with the top shaft, the drive shaft may impart rotary motion to the top shaft. To this end, in some embodiments, the drive shaft may engage with the top shaft via a coupler 414. In some embodiments, the coupler 414 may be mounted on the drive shaft (of the drive motor). Further, the coupler 414 may have a plurality of flutes that enable it to engage with the top shaft. Furthermore, a three-way fitting valve 436 may be fixed at the bottom of the drive shaft using a bracket. This three-way fitting valve 436 may include a plurality of inlet ports and an outlet port.

In some embodiments, the linear actuator 410 may be mounted on a slider jack of a guide rail (not shown in FIG. 4), that may allow the drive motor 408 to move up and down. This entire arrangement may be mounted on the rigid structure of the food processing device 400. The drive motor 408 may be mounted at the bottom of linear actuator 410 via a bracket (not shown in FIG. 1), such that the drive shaft is facing downwards. This allows the drive motor 408 to move up and down as the linear actuator 410 moves up and down.

The drive motor 408 motor and the linear actuator 410 may be coupled to a control unit. A plurality of position sensors 438 may be mounted along the path of drive motor 408, which may generate and transmit feedback of the position of the drive motor 408.

The food processing device 400 may further include an air pump 418 and a water pump 420. A water line or first conduit 422 from a water tank 416 may be connected to the inlet of the water pump 420. An outlet line 424 may be connected to one of the inlet port of the three-way fitting valve 436. Further, an air-line or a second conduit 426 from the air pump 418 may be connected to another inlet port of the three-way fitting valve 436. A safety relief valve may be fitted on the outlet line 424 after the air pump 418 and before the three-way fitting valve 436. The food processing device 400 may further include a heating and cooling unit 440 coupled to the water tank 416. The heating and cooling unit 440 may be configured to receive water from the water tank 416 to increase or decrease the temperature of the water flowing from the water tank 416. Additionally, a water flow sensor 428 may be provided to measure the output flow of water from the water tank 416. The water flow sensor 428 may be made an integral part of the drive motor, or it can be a separate component on the output line. In some embodiments, a cup sensor 430 may be provided to sense the presence of a cup 434, and accordingly send a feedback to the control unit 432.

It may be noted that the control unit 432 may be a micro controller system based Integrated Chip control unit. Further, the control unit 432 may include a plurality of input and output ports, a power supply system to convert the raw line voltage to the required voltage to power the food processing device 400.

In some embodiments, the food processing device 400 may be used in the "On-The-Go" format. The food processing device 400 may include a rechargeable battery. Further, in some embodiments, the food processing device 400 may include a connection module to enable the food processing device 400 to be connected to a mobile device through a mobile application.

Figure 5:
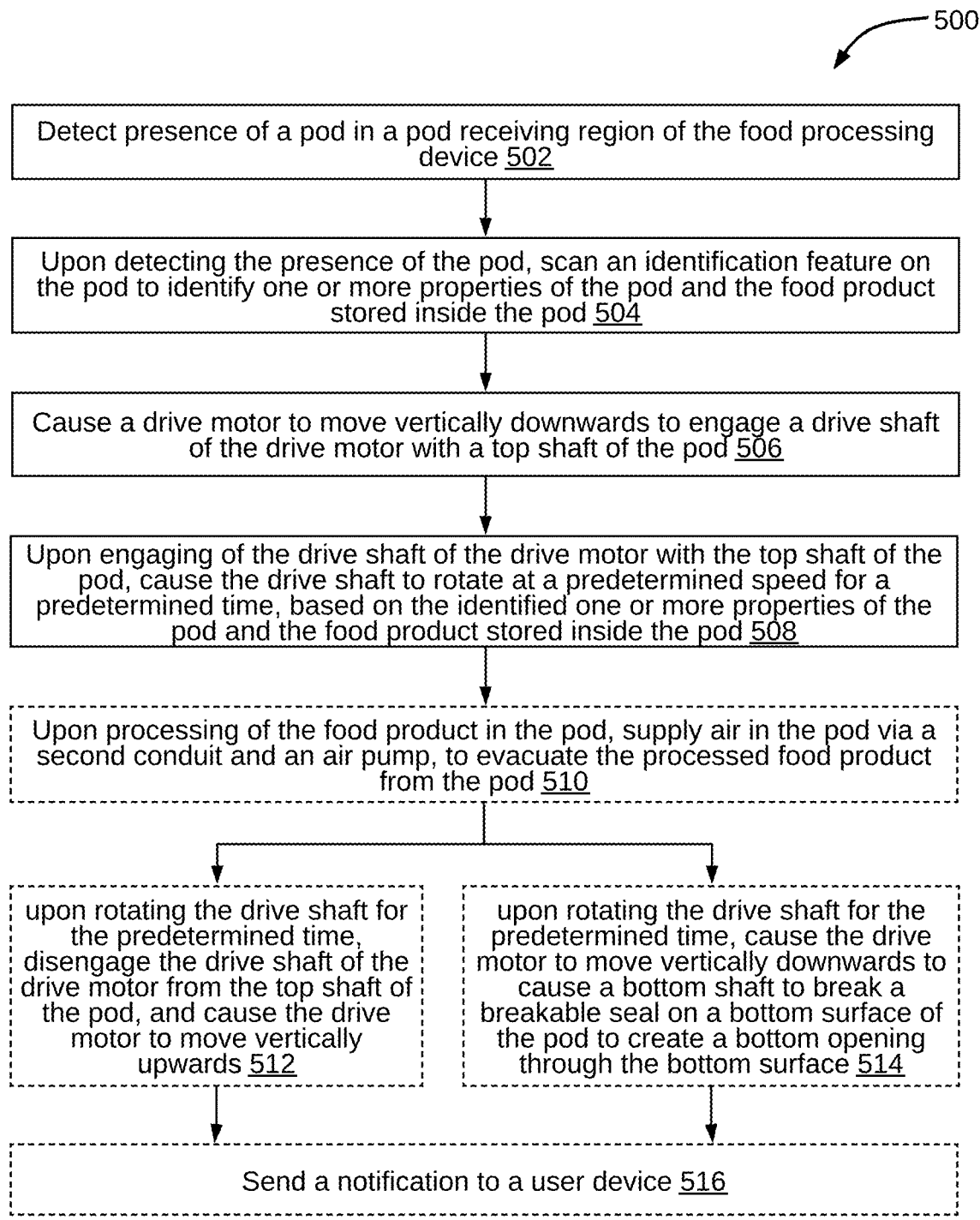
FIG. 5 is a flowchart of a method overview of processing food using a food processing device, in accordance with an embodiment.

Referring now to FIG. 5, a flowchart of a method 500 of processing a food product in a pod using a food processing device is illustrated, in accordance with an embodiment. In some embodiments, the method 500 may be performed using the data processing device 100.

At step 502, presence of a pod is detected in a pod receiving region of the food processing device. At step 504, upon detecting the presence of the pod, an identification feature on the pod may be scanned to identify one or more properties of the pod and the food product stored inside the pod. At step 506, a drive motor may be caused to move vertically downwards to engage a drive shaft of the drive motor with a top shaft of the pod. At step 508, upon engaging of the drive shaft of the drive motor with the top shaft of the pod, the drive shaft may be caused to rotate at a predetermined speed for a predetermined time, based on the identified one or more properties of the pod and the food product stored inside the pod.

Additionally, in some embodiments, at step 510, upon processing of the food product in the pod, air may be supplied in the pod via a second conduit and an air pump, to evacuate the processed food product from the pod.

Further, in some embodiments, upon rotating the drive shaft for the predetermined time, one of the steps 512 and 514 may be performed. For example, at step 512, the drive shaft of the drive motor may be disengaged from the top shaft of the pod. Accordingly, the drive motor may be caused to move vertically upwards, to allow a user to remove the pod with processed food product. At step 514, the drive motor may be caused to move vertically downwards to cause a bottom shaft to break a breakable seal on a bottom surface of the pod to create a bottom opening through the bottom surface to allow the processed food product in the pod to flow out of the pod via the bottom opening.

At step 516, a notification may be sent to a user device. By way of an example, the notification may include at least one of a location of the food processing device, an availability of the food processing device, and status of processing of the food product in the pod.

Figure 6A:
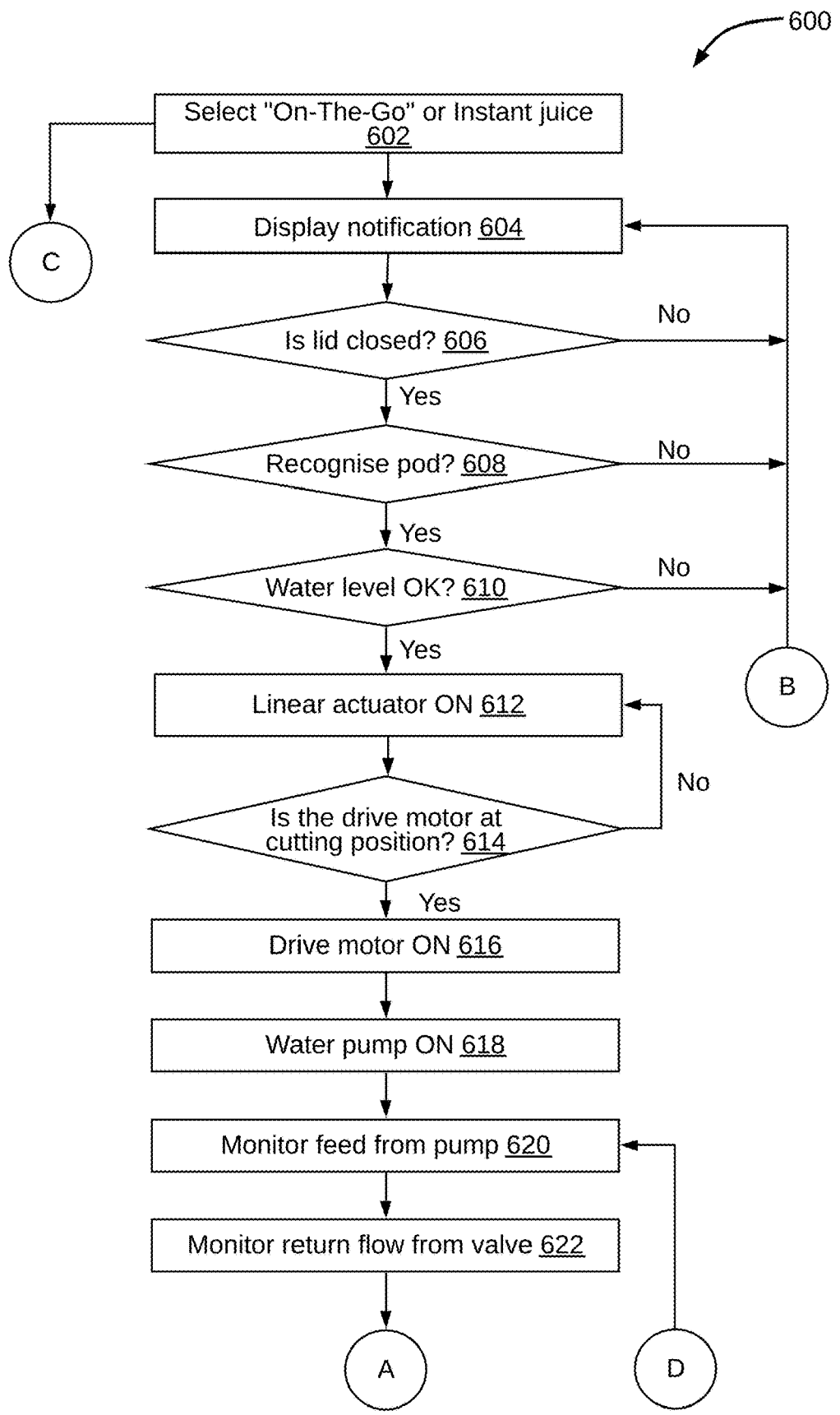
FIGS. 6A-6B is a flowchart of a method of processing food using a food processing device, in accordance with an embodiment.
Figure 6B:
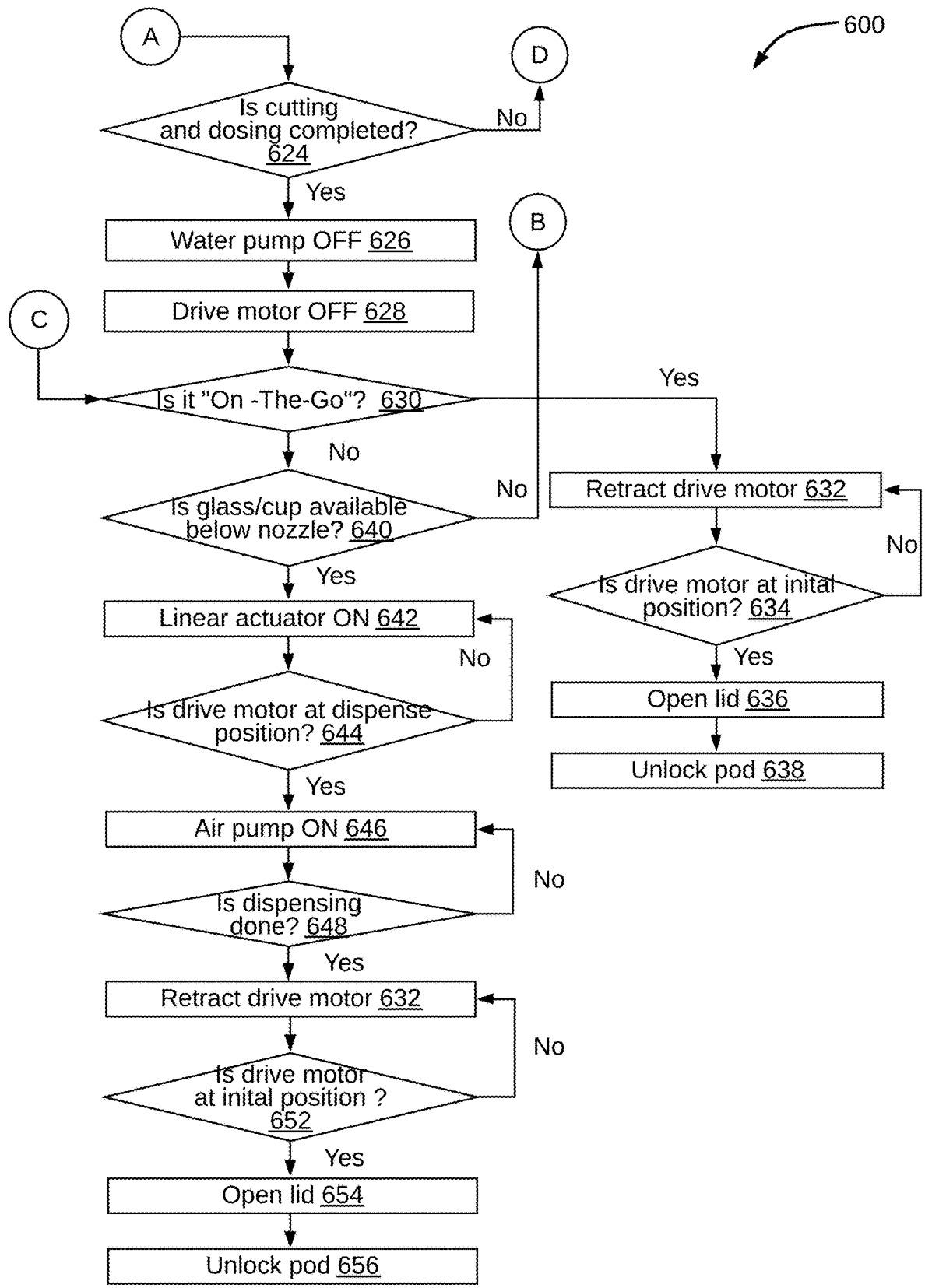

Referring now to FIGS. 6A-6B, a flowchart of a method 600 of processing a food product in a pod using a food processing device is illustrated, in accordance with an embodiment. At step 602, selection of one of "On-The-Go" or "Instant Juice" may be received from a user or automatically determined. For example, this selection may be received via a user interface provided on the food processing device 100. The user may open a lid of the food processing device 100, place a pod, and close the lid. Further, the user may select one of the "On-The-Go" or the "Instant Juice" option from a plurality of user interface buttons. At step 604 at notification may be displayed. For example, the displayed notification may be the "On-The-Go" or the "Instant Juice" option.

At step 606, it may be determined whether the lid is open or closed, by a lid sensor. If it is determined that that the lid is closed, the method may proceed to step 608 ("Yes" path). If it is determined that that the lid is not closed, the method may return to proceed to step 604 ("No" path), and a notification about the lid being not closed may be displayed. At step 608, it may be determined, by a pod sensor, whether a pod is present in the pod receiving region or not. If it is determined that that the pod is present, the method may proceed to step 610 ("Yes" path). Further, if the pod is present, the pod sensor may further identify the pod and send a feedback to the control unit, which may determine information or authenticity of the pod, and contents inside the pod. This may help the control unit to initiate a required function. If it is determined that that the pod is not present, the method 600 may return to proceed to step 604 ("No" path), and a notification about the pod not being present may be displayed. At step 610, it may be determined whether the water level in the water tank is OK or not, for example, using water level sensors. If it is determined that that the water level in the water tank is OK, the method may proceed to step 612 ("Yes" path). If it is determined that that the water level in the water tank is not OK, the method 600 may return to proceed to step 604 ("No" path), and a notification about the water level in the water tank may be displayed.

At step 612, once it is determined that that the lid is closed, the pod is present in the pod receiving region, and the water level in the water tank is OK, a linear movement of the drive motor may be initiated, by powering ON a linear actuator. For example, the linear movement of the drive motor may continue until the drive motor engages with a top shaft of the pod. Meanwhile, a plurality of position sensors may check the position of the drive motor, and provide a feedback about the same to the control unit. For example, at step 614, it may be determined, using a position sensor, that whether the drive motor has engaged with the top shaft of the pod, i.e. the drive motor has reached the cutting position. If it is determined that that the drive motor has reached the cutting position, the method may proceed to step 616 ("Yes" path). If it is determined that that the drive motor has not reached the cutting position, the method 600 may return to step 612 ("No" path), and the linear movement of the drive motor may be continued. At step 616, the drive motor may be switched ON, i.e. the drive motor may start to rotate. At step 618, a water pump may be switched ON, and it may start pumping water inside the pod. At step 620, the water feed from the water pump may be monitored, by a water flow sensor. Further, the water pump may be switched OFF, when required amount of water has been pumped inside the pod. At step 622, return flow from a check valve may be monitored.

It may be noted that the drive motor may be powered ON and OFF repeatedly for a prescribed format and the voltage to motor may be varied to control the speed of the drive motor. A set of pre-coded functions in the software may control different quantity of water being pumped, pattern of repeated ON and OFF of the drive motor, and the speed of drive motor. A set of pre-coded functions may be triggered based on the of pod type. After this blending (cutting) action is complete, the drive motor and the water pump may be turned OFF.

As such, at step 624, it may be determined whether dosing and cutting is completed or not, i.e. whether the required amount of water has been pumped and the drive motor has been run for the required period of time to cut (process) the food product inside the pod. If it is determined that that the dosing and cutting is completed, the method 600 may proceed to step 626 ("Yes" path). If it is determined that that the dosing and cutting is not completed, the method 600 may return to step 620 ("No" path), and the dosing and cutting may be continued until completed. At step 626, the water supply may be cut off, i.e. the water pump may be switched OFF. At step 628, the drive motor may be switched OFF.

At step 630, it may be checked whether the selected operation at step 602 was "On-The-Go" or not (i.e. "Instant Juice")? If the selected operation was "On-The-Go", the method 600 may proceed to step 632 ("Yes" path). At step 632, the linear actuator may cause the drive motor to retract from the cutting position to original position. For example, the linear actuator (due to a counter-clockwise (CCW) direction rotation) may cause the drive motor to retract from the cutting position. At step 634, a check may be performed to determine whether the drive motor has returned to its original position, for example, using a plurality of position sensors. If it is determined that the drive motor has returned to its original position ("Yes" path), the method may proceed to step 636, at which the lid of the food processing device may be opened, and then to step 638, where the pod may be unlocked. However, if it is determined that the drive motor has not returned to its original position ("No" path), the method may return to the step 632 to cause the drive motor to retract from the cutting position. This process may be repeated until the drive motor has returned to its original position.

Returning to step 630, if the selected operation was not "On-The-Go" (i.e. the selected operation was "Instant Juice"), the method 600 may proceed to step 640 ("No" path). At step 640, a check may be performed to determine whether, a glass or a cup is available below the nozzle of the spout (on the pod). If it is determined that the glass or the cup is available below the nozzle of the spout, the method may proceed to step 642. At step 642, the linear actuator be switched ON to cause the drive motor to move further downwards. However, if (at step 640) it is determined that the glass or the cup is not available below the nozzle of the spout, the method 600 may once again proceed to step 604, at which a notification may be displayed that the glass or the cup is not available.

At step 644, a check may be performed to determine if the drive motor is at the cutting position. If it is determined that the drive motor is at the cutting position, the method 600 may proceed to step 646, and where the air pump is switched ON to pump air into the pod to exhaust the contents inside the pod. However, if it is determined that the drive motor is not at the cutting position, the method 600 may return to step 642, and the linear actuator may be kept ON to cause the cutting unit to move downwards until the drive motor has reached the cutting position.

At step 648, a check may be performed to determine if the dispensing is done or not. If it is determined that the dispensing is done, the method 600 may proceed to step 650, where the drive motor may be retracted from the cutting position to original position. For example, the linear actuator (due to counter-clockwise (CCW) direction rotation) may cause the drive motor to retract from the cutting position. At step 652, a check may be performed to determine whether the drive motor has returned to its original position, for example, using a plurality of position sensors. If it is determined that the drive motor has returned to its original position ("Yes" path), the method may proceed to step 654, at which the lid of the food processing device may be opened, and then to step 656, where the pod may be unlocked. However, if it is determined that the drive motor has not returned to its original position ("No" path), the method may return to the step 650 to cause the drive motor to retract from the cutting position. This process may be repeated until the drive motor has returned to its original position.

As will be also appreciated, the techniques performed by the control unit may take the form of computer or controller implemented processes and apparatuses for practicing those processes. The disclosure may also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

As will be appreciated by those skilled in the art, the above techniques relate to processing a food product using a food processing device and a pod. The techniques provide for a simple yet effective way of making fruit or vegetable juice using cut fruits or vegetables. The techniques do away with the need of washing, peeling, and cutting of fruits or vegetables. Further, the techniques provide for a hygienic way of extracting juice. Furthermore, the need for washing, cleaning, and mopping of equipment or utensils involved post juice making process is eliminated. Moreover, the techniques are time and effort and efficient, and help avoiding wastage of fruits or vegetables—as fruit suppliers (factories) may directly buy fruits from farmers and process them. As a result, fruit rejection rate is improved, and farmers have guaranteed market.

It is intended that the disclosure and examples be considered as exemplary only, with a true scope and spirit of disclosed embodiments being indicated by the following claims.

What is claimed is:

1. A food processing device comprising:
a housing comprising a pod receiving region configured to receive a pod,
wherein the food processing device is configured to process a food product stored in the pod, and
wherein the pod comprises:
a container for receiving the food product,
a top shaft coupled to a blade assembly positioned inside the container,
wherein the blade assembly is mounted on the top shaft, and the blade assembly is configured to chop, cut, and blend the food product,
a bottom shaft mechanically coupled to the top shaft, and
a breakable seal at a bottom surface of the container, wherein the breakable seal is configured to be broken by a downward movement of the bottom shaft to create a bottom opening for dispensing contents from the pod;
a drive assembly comprising:
a drive motor configured to rotate and to move linearly in the vertical direction,
a linear actuator comprising an electrical motor is operably coupled to the drive motor, wherein the linear actuator is configured to cause the drive motor to move linearly in the vertical direction, and
a drive shaft coupled to the drive motor, wherein the drive shaft is configured to engage or disengage with the top shaft of the pod via a coupler owing to a linear movement of the drive motor in vertical direction, and wherein upon engaging with the top shaft of the pod, the drive shaft is further configured to impart rotary motion to the top shaft and thereby actuate the blade assembly to process the food product within the pod; and
a control unit comprising configured to operate the food processing device in one or more operation modes,
wherein the control unit is a microcontroller system based integrated chip control unit,
wherein the one or more operation modes comprise at least a first mode,
wherein the control unit is further configured to determine properties of the pod and the food product inside the pod by mapping an identification feature of the pod with a database,
wherein the linear actuator is configured to move the drive motor further downward to break the breakable seal at the bottom surface of the pod in the first mode, creating the bottom opening through the bottom surface to allow contents of the pod to flow out, and
wherein the linear actuator retracts the drive motor, causing the drive shaft to disengage from the top shaft after the breakable seal is broken.

2. The food processing device of claim 1 further comprising at least:
a liquid tank to supply a liquid to the pod positioned in the pod receiving region via the first conduit and a liquid pump; and
an air pump to supply air into the pod positioned in the pod receiving region via a second conduit,
wherein each of the liquid tank and the air pump is configured to couple with the pod to supply the liquid and air, respectively, via a three-way fitting valve fitted to the drive motor.

3. The food processing device of claim 1, further comprising:
a pod sensor to detect presence of the pod in the pod receiving region;
a pod identity sensor configured to identify one or more pod properties, by scanning the identification feature on the pod positioned in the pod receiving region;
at least one position sensor to determine position of the drive motor; and
a lid sensor to identify an open or close position of a lid of the food processing device, wherein the lid is configured to allow or shut access to the pod receiving region.

4. The food processing device of claim 1, wherein the housing comprises:
a plurality of user interface buttons to receive inputs from a user; and a display screen to display at least one of status of food processing of the food product inside the pod, a level of the liquid in the liquid tank, and a temperature reading of the liquid.

5. The food processing device of claim 1, wherein the one or more operation modes comprises at least of a second mode, wherein the linear actuator retracts the drive motor in the second mode, causing the drive shaft to disengage from the top shaft on imparting motion to the top shaft.

* * * * *